Nov. 7, 1944. L. MORROW 2,362,020
NURSING BOTTLE HOLDER
Filed Sept. 7, 1942
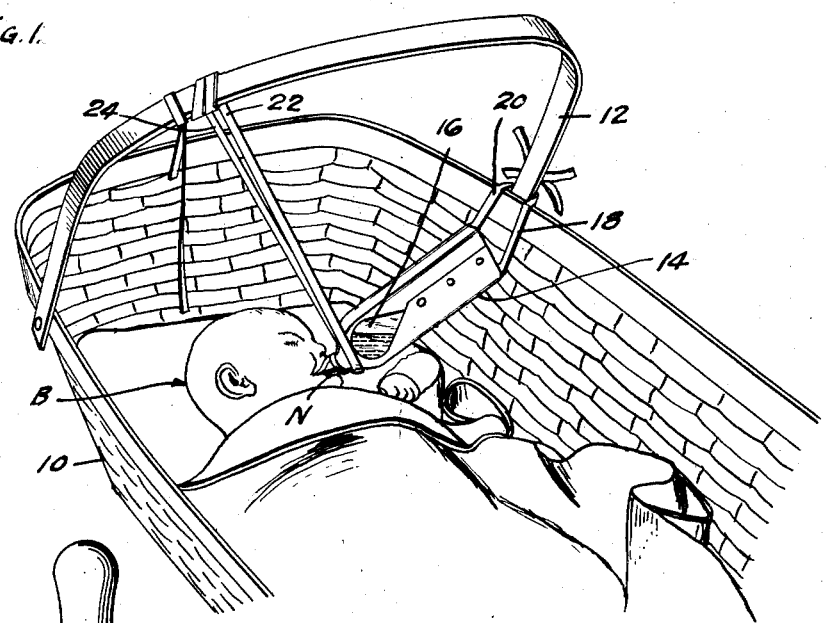
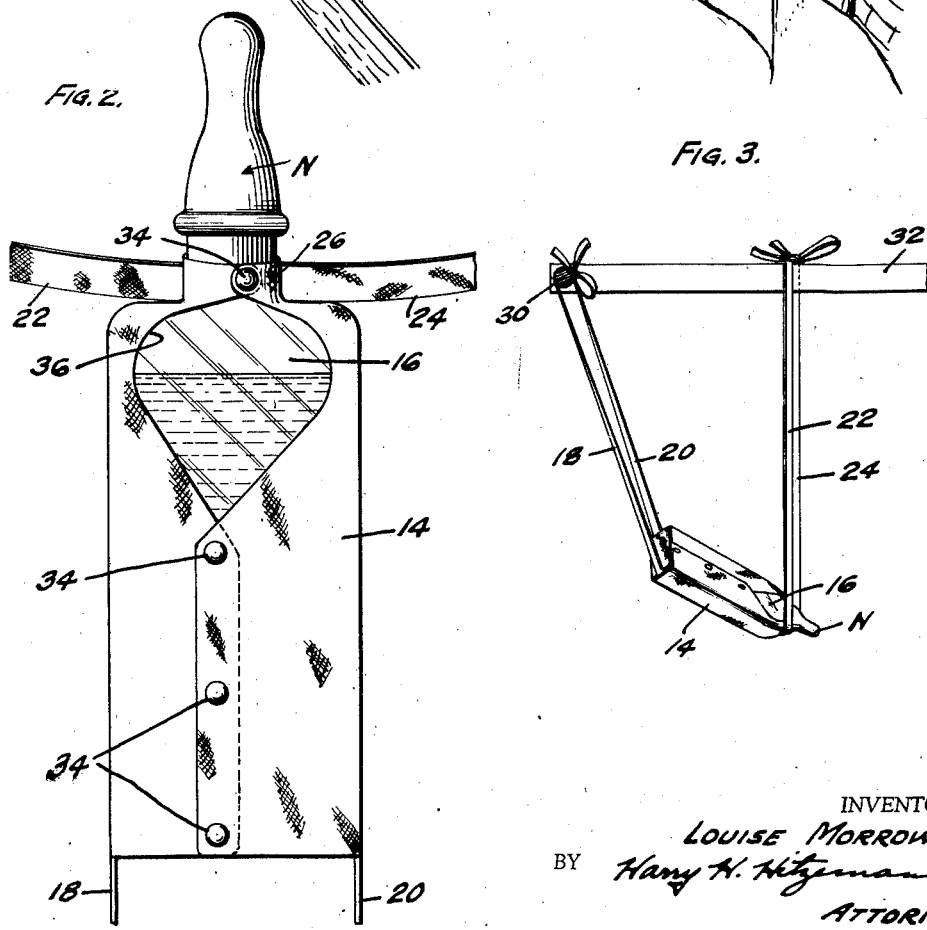
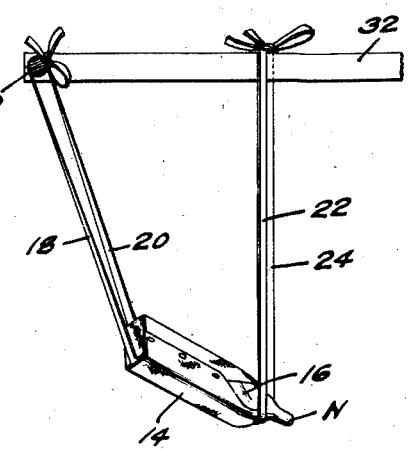
INVENTOR.
LOUISE MORROW
BY Harry N. Hitzeman
ATTORNEY.

Patented Nov. 7, 1944

2,362,020

UNITED STATES PATENT OFFICE 2,362,020

NURSING BOTTLE HOLDER

Louise Morrow, Kane County, Ill.

Application September 7, 1942, Serial No. 457,622

1 Claim. (Cl. 248—102)

My invention relates to improvements for holders or supports for bottles or similar devices.

My invention relates more particularly to a bottle holder or support for nursing bottles for comparatively small infants, and is adapted to be fastened in a crib, basket or other place in which a small baby has been placed to drink milk or similar products.

The principal object of the present invention is to provide a nursing bottle holder of the type which may support a bottle of milk or other substance for an infant in such position that the nipple on the bottle may be positioned in the baby's mouth, and the bottle be held so that the milk or other fluid will flow into the baby's mouth.

A further object of the invention is to provide an improved nursing bottle holder provided with fastening means adjacent the nipple and also at the lower end of the bottle so that the angle of the bottle may be determined by the person who is placing the bottle in a feeding position for a reclining baby in a basket, bed or other receptacle.

A further object of the invention is to provide an improved nursing bottle holder of the type described which is made of cloth or similar material and capable of being easily fastened upon a bottle and easily removed.

A further object of the invention is to provide an improved holder for a nursing bottle provided with snap fasteners and a cut-out portion adjacent the top of the holder so that the amount of milk or other fluid in the bottle is visible while in the holder.

Other objects and advantages will be more apparent from the following description wherein reference is had to the accompanying sheet of drawings, upon which Fig. 1 is a front perspective view showing a basket with a baby placed in a reclining position therein, and a bottle of milk held in feeding position by my improved holder;

Fig. 2 is a front elevational view of the bottle and holder with the straps broken off; and Fig. 3 is a generally diagrammatic sectional view showing the manner in which the bottle holder may be attached to the usual type of baby crib.

In the embodiment of the invention which I have chosen to illustrate, in Fig. 1 I have shown a basket 10 within which a baby B is positioned in a reclining position to receive a feeding of milk or similar substance. The basket is provided with a handle 12 which extends upwardly therefrom.

My improved holder, which may be made of cloth or similar material, is shown at 14 fastened about a nursing bottle 16 with the bottle in a sloping position so that the nipple N may be positioned in the baby's mouth and the bottom end of the bottle be held in a raised position. The holder supports the bottle in this position by means of a pair of straps 18 and 20 which may be tied about the side arm of the handle 12, and a second pair of straps 22 and 24 which may extend from the neck closing portion 26 of the holder 14 and be fastened over the cross-portion of the handle 12 and be suitably tied thereto. The straps at both the upper and the lower end of the holder may be of any suitable length so that the bottle may be positioned at any desired feeding angle.

In Fig. 3 I have shown the bottle 16 supported by the holder 14 and suspended by the straps 18 and 20 from the side bar 30 of a baby crib. The other straps 22 and 24 may be tied over the head cross-member 32 at the head of the crib.

The support, which is made of cloth or other suitable material, may have snap fasteners 34 which enclose the bottle therein, providing, by reason of the cut of the side walls, a window portion 36 adjacent the upper end of the holder. This is for the purpose of permitting an attendant to observe the amount of milk or other fluid which remains in the bottle.

From the above and foregoing description it will be apparent to those skilled in the art that I have provided a comparatively simple, yet highly advantageous type of nursing bottle holder which, by reason of the two sets of straps positioned at the lower and the upper end of the bottle, permit the fastening of the bottle in a basket, crib, or other baby receptacle at any desired angle. For example, if the straps 18 and 20 in Fig. 1 were also tied over the upper portion of the handle 12, the bottle would be in practically a vertical position. In addition, the window which is provided permits of easy visibility of the supply of milk or other fluid remaining in the bottle.

I contemplate that changes and modifications may be made in the exact details shown. What I desire to secure and protect by Letters Patent of the United States is:

A nursing bottle holder constructed of cloth adapted to be fastened about a nursing bottle to secure said bottle therein, said holder having a pair of straps extending from the bottom end of the same, a pair of straps extending from the end adjacent the neck of the bottle, the shape of said nursing bottle holder being such that when it is fastened about the bottle a portion of the bottle adjacent the end will be exposed so that the quantity of the contents therein can be observed.

LOUISE MORROW.